(12) United States Patent
Xu et al.

(10) Patent No.: US 10,839,130 B1
(45) Date of Patent: Nov. 17, 2020

(54) METAL LAYER ROUTING BASED ON GRID REGIONS

(71) Applicant: International Business Machines Corporation, Armonk, NY (US)

(72) Inventors: Yue Xu, Shanghai (CN); Wen Yin, Shanghai (CN); Tong Zhao, Shanghai (CN); Jin Song Jiang, Shanghai (CN); Yang Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/437,860

(22) Filed: Jun. 11, 2019

(51) Int. Cl.
*G06F 30/392* (2020.01)
*G06F 119/12* (2020.01)

(52) U.S. Cl.
CPC ........ G06F 30/392 (2020.01); *G06F 2119/12* (2020.01)

(58) Field of Classification Search
CPC .................................................... G06F 30/392
USPC ........................................ 716/124, 126, 131
See application file for complete search history.

(56) References Cited

U.S. PATENT DOCUMENTS

| | | | |
|---|---|---|---|
| 7,793,241 B2* | 9/2010 | Tai et al. ................. | G06F 30/39 716/115 |
| 7,797,654 B2* | 9/2010 | Tai et al. ................. | G06F 30/39 716/111 |
| 9,076,065 B1* | 7/2015 | Vijayanarasimhan ...................... | G06K 9/6256 |
| 9,292,647 B2 | 3/2016 | Yuan et al. | |
| 2007/0094630 A1* | 4/2007 | Bhooshan ............. | G06F 30/394 716/112 |
| 2008/0178141 A1* | 7/2008 | Sato .......................... | G03F 1/36 716/53 |
| 2014/0264894 A1 | 9/2014 | Tien et al. | |
| 2016/0085897 A1 | 3/2016 | Jeong | |
| 2017/0300608 A1 | 10/2017 | Narisetty et al. | |

OTHER PUBLICATIONS

Yongchan Ban and David Z. Pan, "Self-Aligned Double-Patterning Layout Decomposition for Two-Dimensional Random Metals for Sub-10-NM Node Design," Journal of Micro/Nanolithography, MEMS, and MOEMS, Mar. 2, 2015, 16 pages.

Youngsoo Song; Jinwook Jung; Daijoon Hyun; Youngsoo Shin, "Timing Optimization in SADP Process Through Wire Widening and Double Via Insertion," SPIE.Digital Library, 2018.

* cited by examiner

*Primary Examiner* — Sun J Lin
(74) *Attorney, Agent, or Firm* — Patterson + Sheridan, LLP (57) ABSTRACT

A computer-implemented method, and associated system and computer program product, for use in a design process for an integrated circuit (IC) comprises dividing a layout of a metal layer of the IC into a grid comprising a plurality of grid regions, calculating a respective weight for each grid region of the plurality of grid regions, and forming a plurality of groups based on a similarity of the respective weights. Each group of the plurality of groups respectively comprises one or more contiguous grid regions of the plurality of grid regions. The method further comprises assigning each group of the plurality of groups to a respective routing width group type of a plurality of routing width group types, and determining a location for one or more separator cells between adjacent groups of the plurality of groups that are of different routing width group types.

20 Claims, 8 Drawing Sheets

METAL LAYER ROUTING BASED ON GRID REGIONS

BACKGROUND

The present disclosure relates to integrated circuit (IC) design, and more specifically, to designing metal layer routing based on grid regions.

Multiple patterning technologies are typically used to achieve 10 nanometers (nm) node semiconductor processes and smaller. With these smaller semiconductor processes, the spacing between metal shapes requires increased accuracy. Metal layer routing can support different routing widths for different drive strengths. For example, Width Space Patterning (WSP) used with a Self-Aligned Double Patterning (SADP) process may have several predefined different routing widths. However, WSP regions are typically defined within a floorplan as large contiguous areas, making the placement of components with critical timing paths challenging.

SUMMARY

According to one or more embodiments, a computer-implemented method for use in a design process for an integrated circuit (IC) comprises dividing a layout of a metal layer of the IC into a grid comprising a plurality of grid regions, calculating a respective weight for each of the plurality of grid regions, and forming a plurality of groups based on a similarity of the respective weights. Each group of the plurality of groups comprises a respective one or more contiguous grid regions of the plurality of grid regions. The method further comprises assigning each group of the plurality of groups to a respective routing width group type of a plurality of routing width group types, and determining a location for one or more separator cells between adjacent groups of the plurality of groups that are of different routing width group types.

According to one or more embodiments, a system comprises one or more computer processors configured to perform an operation for use in a design process for an integrated circuit (IC). The operation comprises dividing a layout of a metal layer of the IC into a grid comprising a plurality of grid regions, calculating a respective weight for each of the plurality of grid regions, and forming a plurality of groups based on a similarity of the respective weights. Each group of the plurality of groups comprises a respective one or more contiguous grid regions of the plurality of grid regions. The operation further comprises assigning each group of the plurality of groups to a respective routing width group type of a plurality of routing width group types, and determining a location for one or more separator cells between adjacent groups of the plurality of groups that are of different routing width group types.

According to one or more embodiments, a computer program product comprises a computer-readable storage medium having computer-readable program code embodied therewith, the computer-readable program code executable by one or more computer processors to perform an operation for use in a design process for an integrated circuit (IC). The operation comprises dividing a layout of a metal layer into a grid comprising a plurality of grid regions, calculating a respective weight for each of the plurality of grid regions, and forming a plurality of groups based on a similarity of the respective weights. Each group of the plurality of groups comprises a respective one or more contiguous grid regions of the plurality of grid regions. The operation further comprises assigning each group of the plurality of groups to a respective routing width group type of a plurality of routing width group types, and determining a location for one or more separator cells between adjacent groups of the plurality of groups that are of different routing width group types.

BRIEF DESCRIPTION OF THE SEVERAL VIEWS OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Embodiments herein are directed to techniques for use in an IC design process. An exemplary method comprises dividing a layout of a metal layer of the IC into a grid comprising a plurality of grid regions, calculating a respective weight for each of the plurality of grid regions, and forming a plurality of groups based on a similarity of the respective weights. Each group of the plurality of groups comprises a respective one or more contiguous grid regions of the plurality of grid regions. The method further comprises assigning each group of the plurality of groups to a respective routing width group type of a plurality of routing width group types, and determining a location for one or more separator cells between adjacent groups of the plurality of groups that are of different routing width group types.

Beneficially, using the plurality of grid regions allows for a more flexible design of the metal layer routing. As a result, IC components may be more flexibly placed to improve critical timing paths therebetween. In some cases, the techniques discussed herein may be integrated into an existing physical synthesis stage or an existing automatic placement and routing stage without disrupting the continuity of the stages.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

Figure 1:
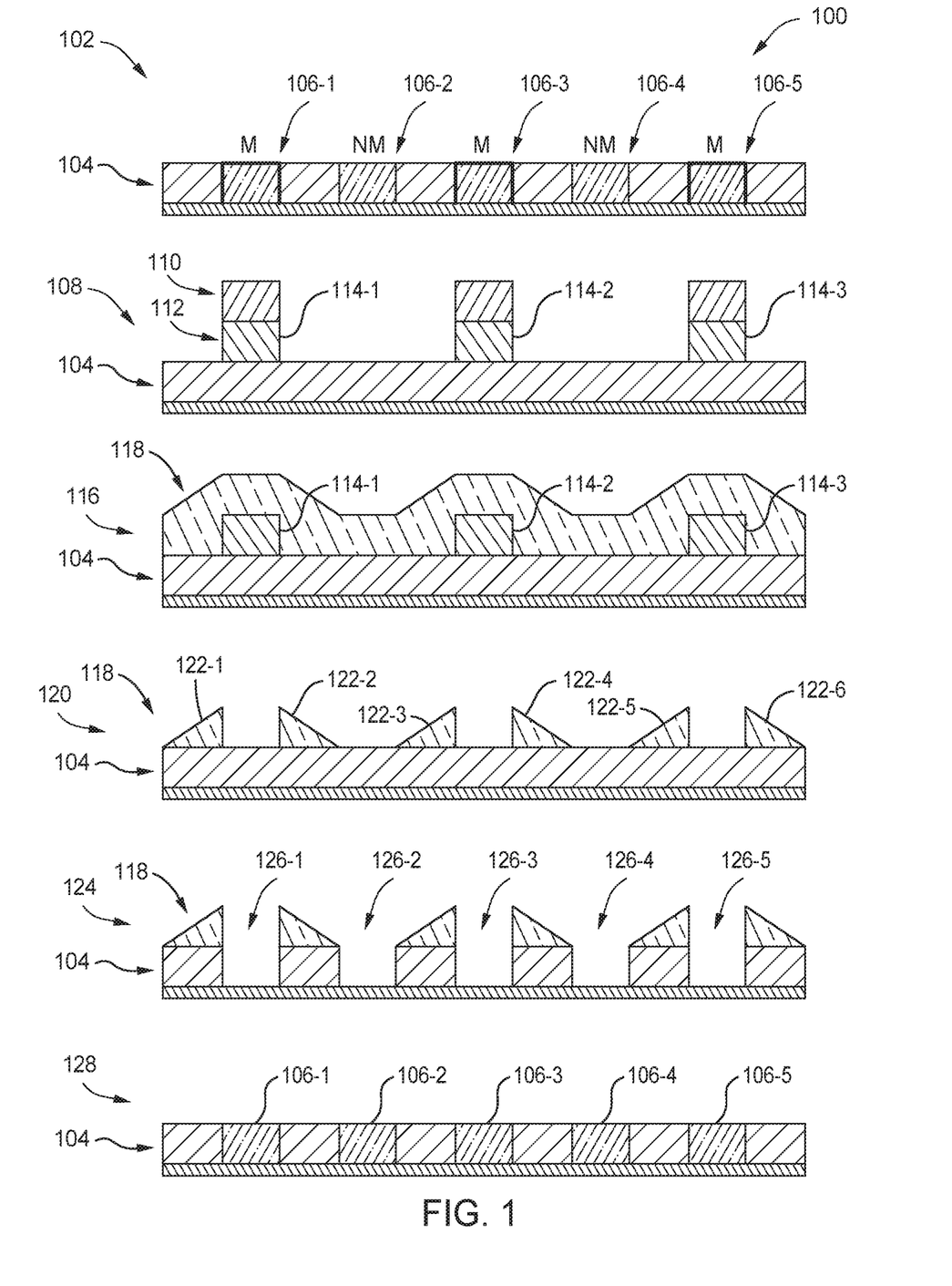
FIG. 1 illustrates an exemplary SADP sequence, according to one or more embodiments.

FIG. 1 illustrates an exemplary SADP sequence 100, according to one or more embodiments. More specifically, the sequence 100 illustrates cross-sectional views of an IC design using a spacer is dielectric (SID) type SADP process, although other types of multiple patterning processes are also contemplated.

In step 102, a plurality of metal shapes 106-1, 106-2, . . . , 106-5 are planned with an arrangement in a dielectric layer 104 (e.g., an oxide layer). Generally, each of the metal shapes 106-1, 106-2, . . . , 106-5 is implemented as a trench in the dielectric layer 104 that is filled with copper or other suitable metal to form a metal interconnect. The metal shapes 106-1, 106-2, . . . , 106-5 are spaced closely enough that more than one mask is required. As shown, the metal shapes 106-1, 106-3, 106-5 are assigned to be formed using a first mask, also called a mandrel mask 110. The metal shapes 106-2, 106-4 are not assigned to the first mask. The assignment of the metal shapes 106-1, 106-3, 106-5 is denoted by "M", and the non-assignment of the metal shapes 106-2, 106-4 is denoted by "NM".

In step 108, a hard mask layer 112 is arranged above the dielectric layer 104, and the mandrel mask 110 is arranged above the hard mask layer 112. An etch process is performed on the hard mask layer 112, which is patterned by the mandrel mask 110 to form features 114-1, 114-2, 114-3.

In step 116, a spacer layer 118 (e.g., a dielectric material) is deposited above the dielectric layer 104 and the features 114-1, 114-2, 114-3. In step 120, an etch process is performed on the spacer layer 118, forming a pair of spacers 122-1, 122-2 on opposing sides of the feature 114-1, a pair of spacers 122-3, 122-4 on opposing sides of the feature 114-2, and a pair of spacers 122-5, 122-6 on opposing sides of the feature 114-3. The features 114-1, 114-2, 114-3 may be removed using any suitable process, such as a sacrificial layer etch process performed after the spacer etch process.

In step 124, an etch process is performed on the dielectric layer 104, forming trenches 126-1, 126-2, . . . , 126-5. Although not illustrated here, a second mask may be applied above the spacer layer 118 to form only selected ones of the trenches 126-1, 126-2, . . . , 126-5. For example, in an alternate arrangement in which the metal shape 106-4 is omitted, the second mask may be arranged between the spacers 122-4, 122-5, such that the trench 126-4 is not formed at step 124. As shown, the trenches 126-1, 126-3, 126-5 are formed between the spacers of a respective pair (e.g., the trench 126-1 is formed between the spacers 122-1, 122-2), and the trenches 126-2, 126-4 are formed between the spacers of adjacent pairs (e.g., the trench 126-2 is formed between the spacers 122-2, 122-3). By etching the dielectric layer 104 on both sides of the spacers 122-1, 122-2, . . . , 122-6, a spacing smaller than a minimum pitch is supported between adjacent trenches 126-1, 126-2, . . . , 126-5.

In step 128, copper is deposited into the trenches 126-1, 126-2, . . . , 126-5 to form the metal shapes 106-1, 106-2, . . . , 106-5. Other processing steps may be performed, such as a chemical mechanical polishing (CMP) process to provide a flat or otherwise uniform surface.

Beneficially, the SADP process illustrated in the sequence 100 can support a 10 nm technology or smaller. The spacing between the metal shapes 106-1, 106-2, . . . , 106-5 is more accurately controlled using the SADP process, as the spacers are formed through deposition and etching instead of aligning multiple masks to each other (e.g., as in litho-etch-litho-etch (LELE) double patterning). As a result, fewer mask steps are required in SADP than in LELE double patterning, reducing costs and/or improving the yield of the process.

Figure 2:
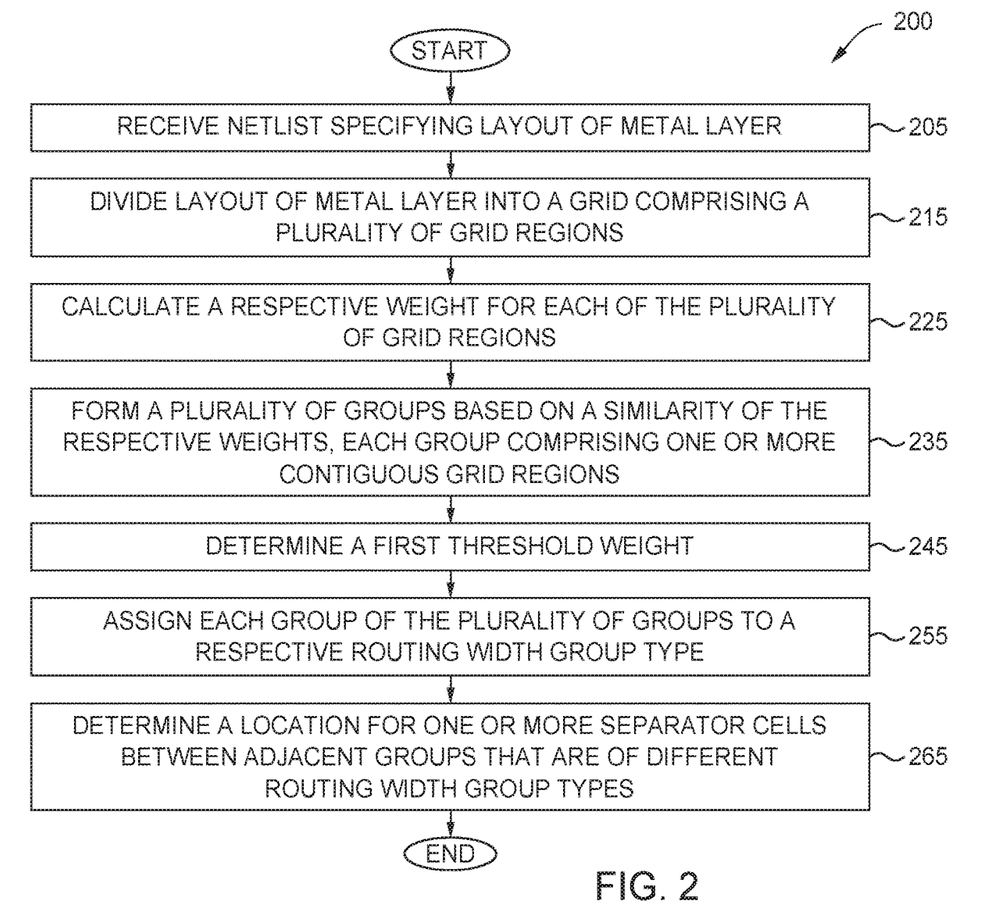
FIG. 2 illustrates an exemplary method for use in a design process for an IC, according to one or more embodiments.

FIG. 2 illustrates an exemplary method 200 for use in a design process for an IC, according to one or more embodiments. The features illustrated in the method 200 may be used in conjunction with other embodiments, e.g., performed within step 102 of FIG. 1 using the IC design module 815 of FIG. 8, discussed below.

The method 200 begins at block 205, where the IC design module receives a netlist specifying a layout of a metal layer of the IC. In some embodiments, the netlist is a placed and optimized checkpoint netlist. At block 215, the IC design module divides the layout of the metal layer into a grid comprising a plurality of grid regions. In some embodiments, each grid region has a same size as the global routing grid.

At block 225, the IC design module calculates a respective weight for each of the plurality of grid regions. In some embodiments, calculating the respective weight for each grid region is based on one or both of a timing slack and a congestion of the respective grid region.

At block 235, the IC design module forms a plurality of groups based on a similarity of the respective weights. Each group comprises one or more contiguous grid regions of the plurality of grid regions. In some embodiments, forming the plurality of groups comprises optimizing a cost function based on the respective weights.

At block 245, the IC design module determines a first threshold weight for assigning each group to a respective routing width group type of a plurality of routing width group types. In some embodiments, the threshold weight is iteratively updated from the first threshold weight, e.g., according to method 300 of FIG. 3. Beneficially, updating the threshold weight can reduce the number of transitions between adjacent groups that are of different routing width group types, which reduces a number of separator cells that are required. Reducing the number of separator cells may free area within the IC floorplan, supporting additional functionality of the IC. Reducing the number of separator cells may also reduce the complexity of layout graphics and/or improve the yield of the IC fabrication.

Figure 3:
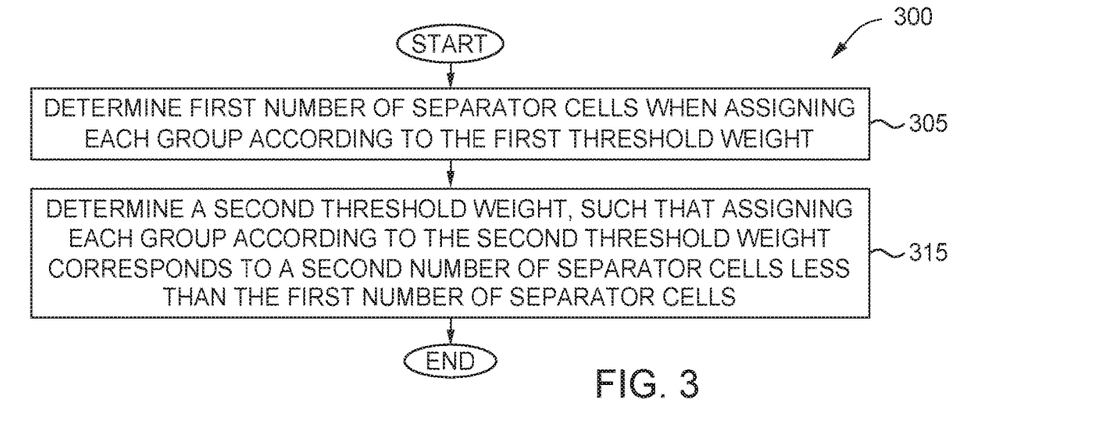
FIG. 3 illustrates an exemplary method for determining a threshold weight for assigning groups to routing width group types, according to one or more embodiments.

The method 300 begins at block 305, where the IC design module determines a first number of separator cells when assigning each group according to the first threshold weight. At block 315, the IC design module determines a second threshold weight, such that assigning each group according to the second threshold weight corresponds to a second number of separator cells less than the first number of separator cells. The updating of the threshold weight shown in blocks 305, 315 may be performed as many times as desired. In some embodiments, the threshold weight is updated until a value of the threshold weight yielding a minimum number of separator cells has been determined. The method 300 ends following completion of block 315.

Returning now to FIG. 2, at block 255, the IC design module assigns each group of the plurality of groups to a respective routing width group type. Each routing width group type corresponds to a number of routing traces having one or more routing widths. In some embodiments, different routing width group types correspond to different numbers and/or different routing widths of the routing traces.

Figure 7:
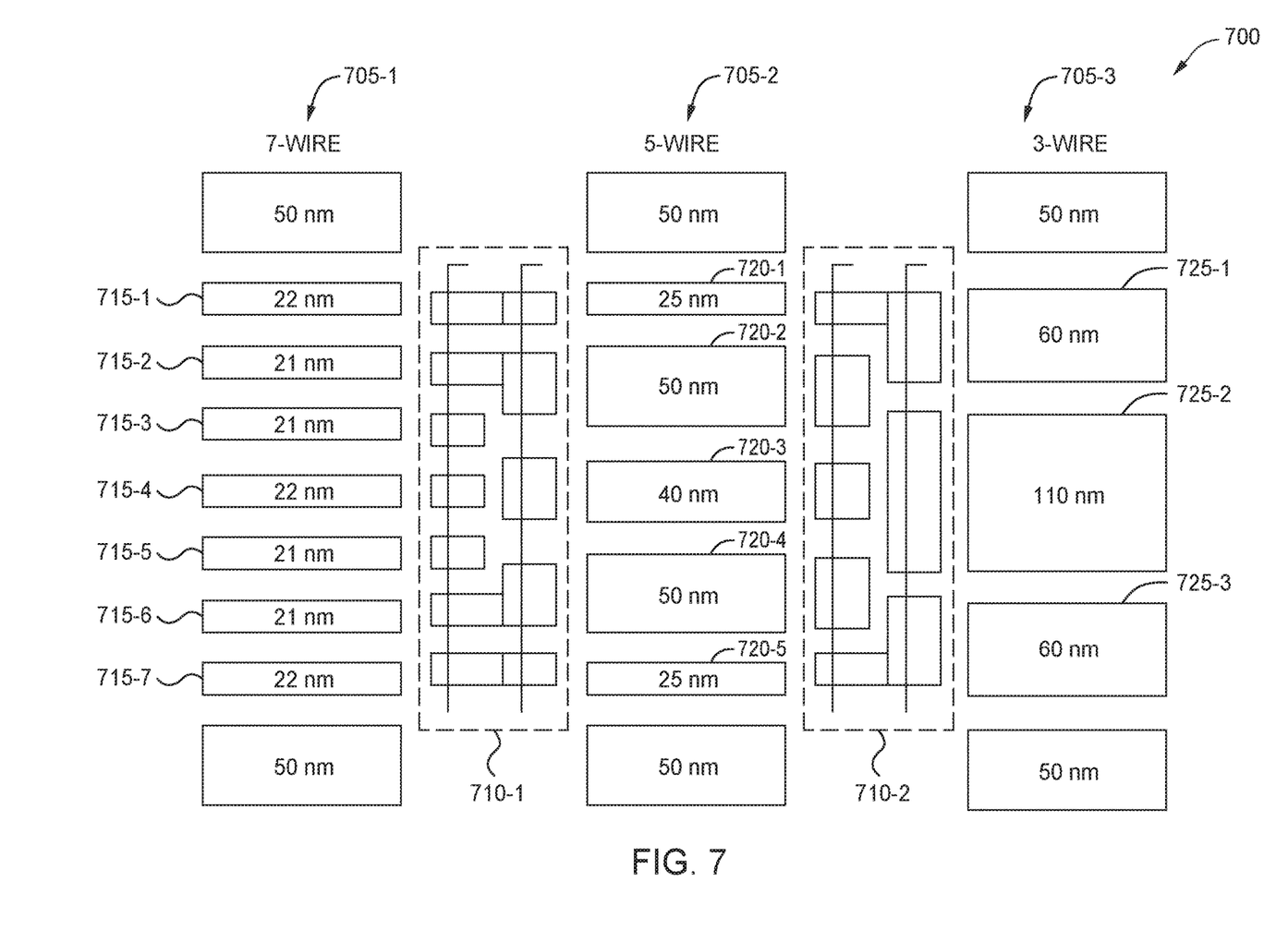
FIG. 7 illustrates exemplary routing width group types, according to one or more embodiments.

For example, diagram 700 of FIG. 7 illustrates three (3) routing width groups 705-1, 705-2, 705-3, each of a different routing width group type. The routing width group types may be predetermined or dynamically determined. The routing width group 705-1 is of a 7-wire WSP routing width group type, including seven (7) routing traces 715-1, 715-2, . . . , 715-7. Each routing trace 715-1, 715-2, . . . , 715-7 has a routing width of 21 nm or 22 nm. The routing width group 705-2 is of a 5-wire WSP routing width group type, including five (5) routing traces 720-1, 720-2, . . . , 720-5. The routing traces 720-1, 720-5 have a routing width of 25 nm, the routing traces 720-2, 720-4 have a routing width of 50 nm, and the routing trace 720-3 has a routing width of 40 nm. The routing width group 705-3 is of a 3-wire WSP routing width group type, including three (3) routing traces 725-1, 725-2, 725-3. The routing traces 725-1, 725-3 have a routing width of 60 nm, and the routing trace 725-2 has a routing width of 110 nm. The outer routing traces (shown as 50 nm, although other sizes are also contemplated) may provide voltage references.

The different routing widths specified in the routing width groups 705-1, 705-2, 705-3 may support different drive strengths. For example, the larger routing widths generally support larger drive strengths (i.e., more current flowing), and the smaller routing widths generally support smaller drive strengths (i.e., less current flowing).

As discussed above, the IC design module forms a plurality of groups (block 235), and each group comprises one or more contiguous grid regions of the plurality of grid regions. The IC design module determines a first threshold weight for assigning each group to a respective routing width group type, e.g., based on a timing slack and/or a congestion of the respective grid region. In some embodiments, adjacent groups having different routing width group types are transitioned using separator cells. As shown in the diagram 700, a separator cell 710-1 transitions between the routing width groups 705-1, 705-2, and a separator cell 710-2 transitions between the routing width groups 705-2, 705-3. Within the separator cell 710-1, the routing traces 715-1, 720-1 are coupled together, the routing traces 715-2, 720-2 are coupled together, the routing traces 715-6, 720-4 are coupled together, and the routing traces 715-7, 720-5 are coupled together. Within the separator cell 710-2, the routing traces 720-1, 725-1 are coupled together, and the routing traces 720-5, 725-3 are coupled together.

Returning now to FIG. 2, at block 265, the IC design module determines a location for one or more separator cells between adjacent groups that are of different routing width group types. The method 200 ends following completion of block 265.

FIGS. 4A-4D illustrate an exemplary sequence 400 of metal layer routing based on grid regions, according to one or more embodiments. The features described in the sequence 400 may be used in conjunction with other embodiments, e.g., as part of the method 200 of FIG. 2.

Figure 4A:
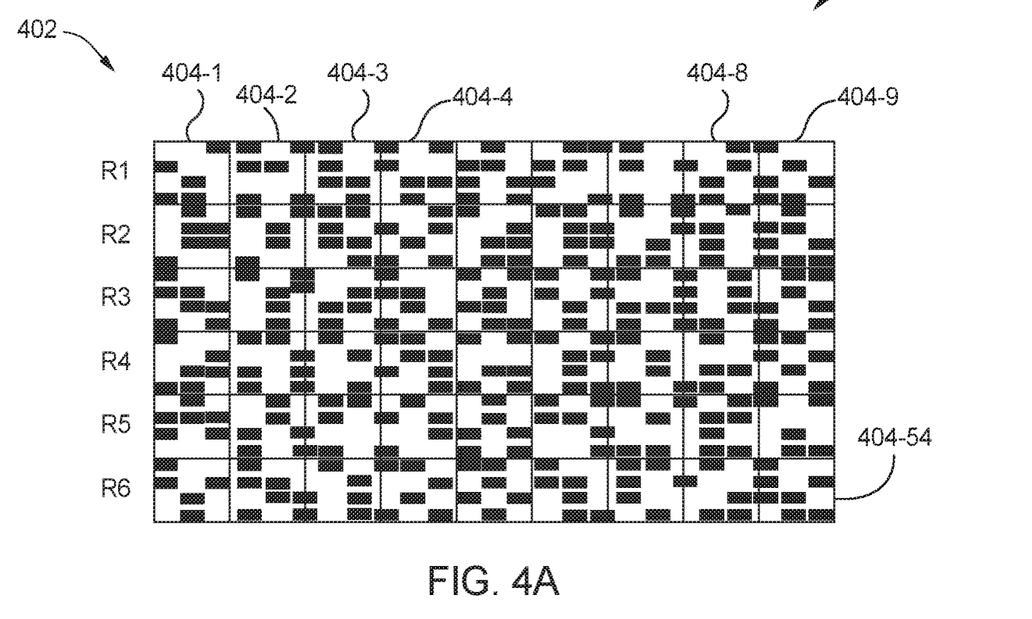
FIGS. 4A-4D illustrate an exemplary sequence of metal layer routing based on grid regions, according to one or more embodiments.

In step 402, a layout of the metal layer is divided into a grid comprising a plurality of grid regions 404-1, 404-2, . . . , 404-54. In some embodiments, the layout of the metal layer is specified by a placed and optimized checkpoint netlist. In some embodiments, each grid region 404-1, 404-2, . . . , 404-54 has a same size. In some cases, the size of each grid region 404-1, 404-2, . . . , 404-54 is a same size as the global routing grid (also referred to as g-cell), to support a maximum number of routing tracks. As shown, the grid includes fifty-four (54) grid regions that are arranged in six (6) rows R1, R2, . . . , R6 and nine (9) columns, although other numbers and arrangements of the grid regions are also contemplated.

Figure 4B:
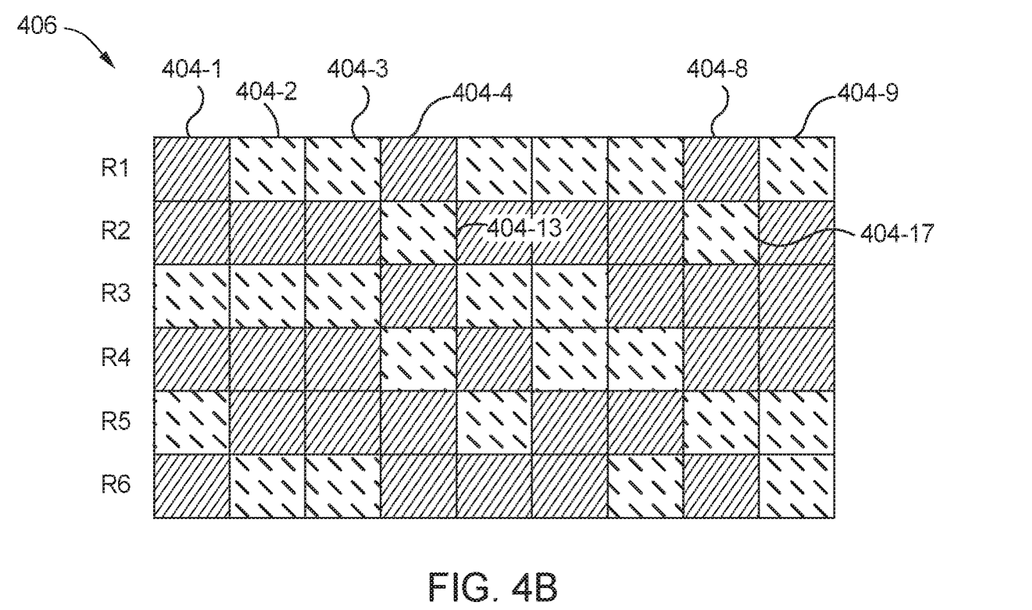

In step 406, respective weights are calculated for the grid regions 404-1, 404-2, . . . , 404-54. In some embodiments, calculating the respective weight for each grid region is based on one or both of a timing slack and a congestion of the respective grid region. In some embodiments, calculating the respective weights comprises performing global (or rough) routing and timing analysis.

In some embodiments, for each grid region $G_i$ of the metal layer, the respective weight is calculated according to:

$$\text{Weight}_i = \alpha S_i + C_i (C_i \leq 1)$$

$$\text{Weight}_i = 0 (C_i > 1),$$

where $\alpha$ represents a scaling factor, $S_i$ represents a normalized timing slack for the nets in $G_i$, and $C_i$ represents a congestion computed through one or more effective edges of $G_i$.

In some embodiments, the normalized timing slack $S_i$ is calculated according to:

$$S_i = \frac{WNS_i}{TNS_i},$$

where $WNS_i$ represents a worst negative slack (i.e., a greatest magnitude) of the nets in $G_i$, and $TNS_i$ represents a total negative slack (i.e., a sum) of the nets in $G_i$.

In some embodiments, the congestion $C_i$ for a grid region $G_i$ is calculated according to:

$$C_i = \sum_{j=1}^{N} \frac{Demand_j}{Supply_j},$$

where the grid region $G_i$ has N effective edges, where $Demand_j$ represents an actual count of the nets extending through an effective edge j of a grid region of the grid regions 404-1, 404-2, . . . , 404-54, and where $Supply_j$ represents a capacity of the channels available through the effective edge j. In some embodiments, a capacity through the effective edge j may be different for different metal layers.

Figure 5:
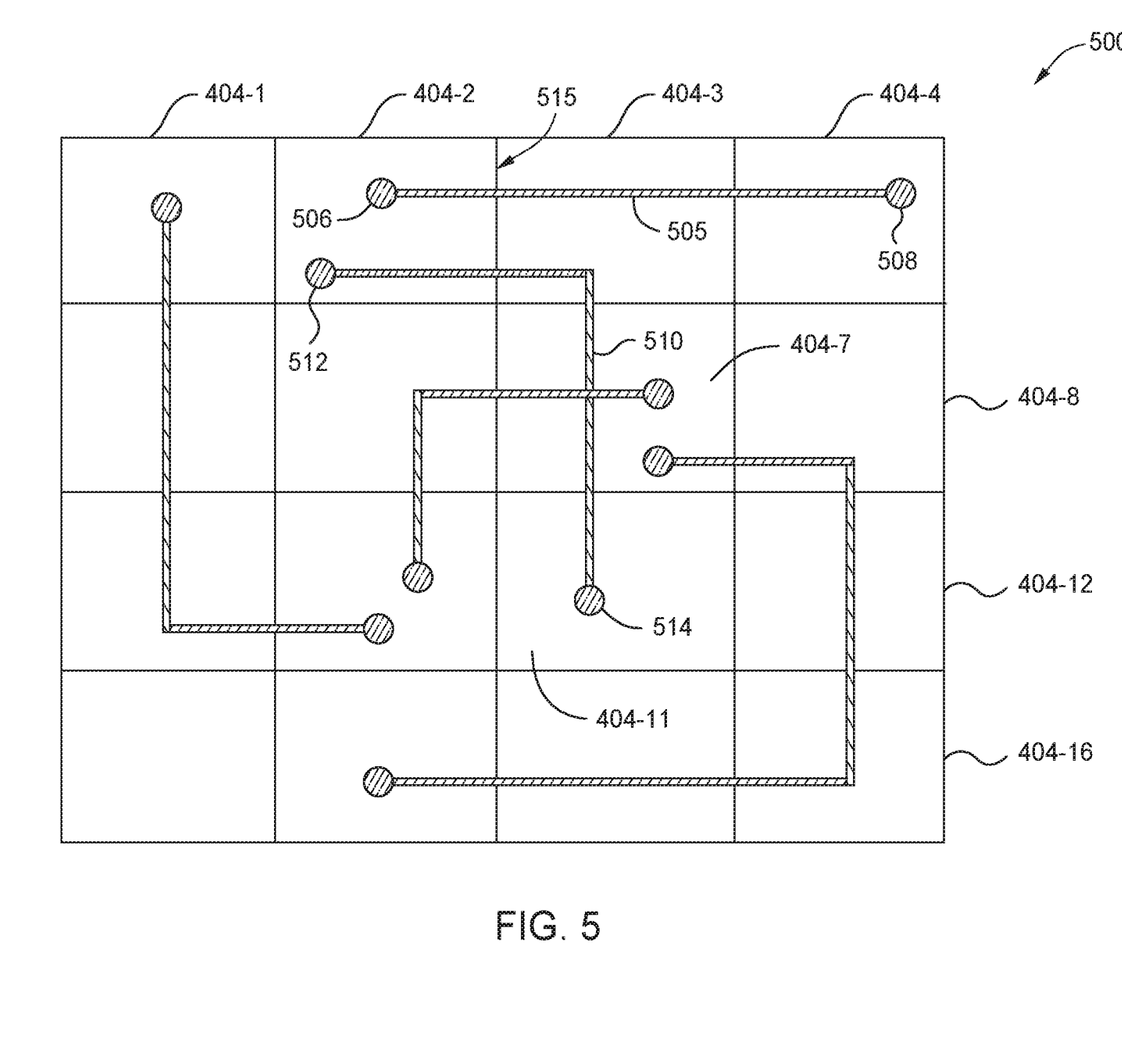
FIG. 5 illustrates an exemplary plurality of grid regions, according to one or more embodiments.

Referring now to FIG. 5, diagram 500 illustrates a plurality of grid regions 404-1, 404-2, . . . , 404-16. A routing trace 505 extends from a terminal 506 in the grid region 404-2, through an effective edge 515 of the grid region 404-2, through the grid region 404-3, and to a terminal 508 in the grid region 404-4. Another routing trace 510 extends from a terminal 512 in the grid region 404-2, through the effective edge 515, through the grid regions 404-3, 404-7, and to a terminal 514 in the grid region 404-11. As shown, the grid region 404-7 has four (4) effective edges corresponding to four (4) congestions: $C_e$ (e.g., an east direction), $C_w$ (e.g., a west direction), $C_n$ (e.g., a north direction), $C_s$ (e.g., a south direction). The grid region 404-7 has an overall congestion $C_i=C_e+C_w+C_n+C_s$. Different grid regions of the plurality of grid regions 404-1, 404-2, ..., 404-16 may have different numbers of effective edges.

Returning to FIG. 4B, at step 406 the grid regions 404-1, 404-2, ..., 404-54 are classified into different clusters based on the respective weights. As shown, the grid regions 404-1, 404-4, 404-8 are classified into a first cluster based on a similarity of their respective weights, and the grid regions 404-2, 404-3, 404-5, 404-6, 404-7, 404-9, 404-13, 404-17 are classified into a second cluster based on a similarity of their respective weights. In some embodiments, each of the different clusters corresponds to a particular weight value, such that grid regions having approximately a same weight value are classified similarly. In some embodiments, classifying the grid regions 404-1, 404-2, ..., 404-54 into different clusters represents an initial assignment (or distribution) of routing width groups.

Figure 4C:
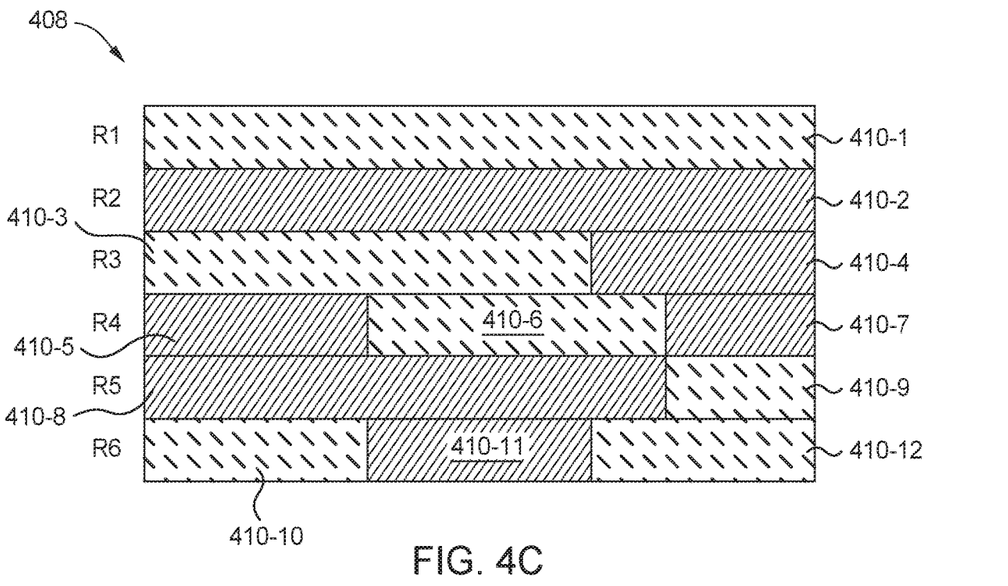

At step 408, a plurality of groups 410-1, 410-2, ..., 410-12 are formed based on a similarity of the respective weights of the grid regions 404-1, 404-2, ..., 404-54. Each of the groups 410-1, 410-2, ..., 410-12 comprises a respective one or more contiguous grid regions of the grid regions 404-1, 404-2, ..., 404-54. Each of the groups 410-1, 410-2, ..., 410-12 is assigned a respective routing width group type. For example, the groups 410-1, 410-3, 410-6, 410-9, 410-10, 410-12 may be assigned a 5-wire WSP routing width group type, and the groups 410-2, 410-4, 410-5, 410-7, 410-8, 410-11 may be assigned a 7-wire WSP routing width group type. In some embodiments, the groups 410-1, 410-2, ..., 410-12 are formed using one or more threshold weights. For example, a first threshold weight may be used to distinguish the 5-wire and 7-wire WSP routing width group types.

In some embodiments, one or more of the grid regions 404-1, 404-2, ..., 404-54 are reassigned when forming the plurality of groups 410-1, 410-2, ..., 410-12. For example, the grid region 404-13 may be reassigned from the 7-wire WSP routing width group type to the 5-wire WSP routing width group type, and the grid region 404-17 may be reassigned from the 7-wire WSP routing width group type to the 5-wire WSP routing width group type, such that the entirety of row R2 is included in the group 410-2. Generally, reassigning one or more of the grid regions 404-1, 404-2, ..., 404-54 may reduce a number of separator cells required between the groups 410-1, 410-2, ..., 410-12.

Figure 4D:
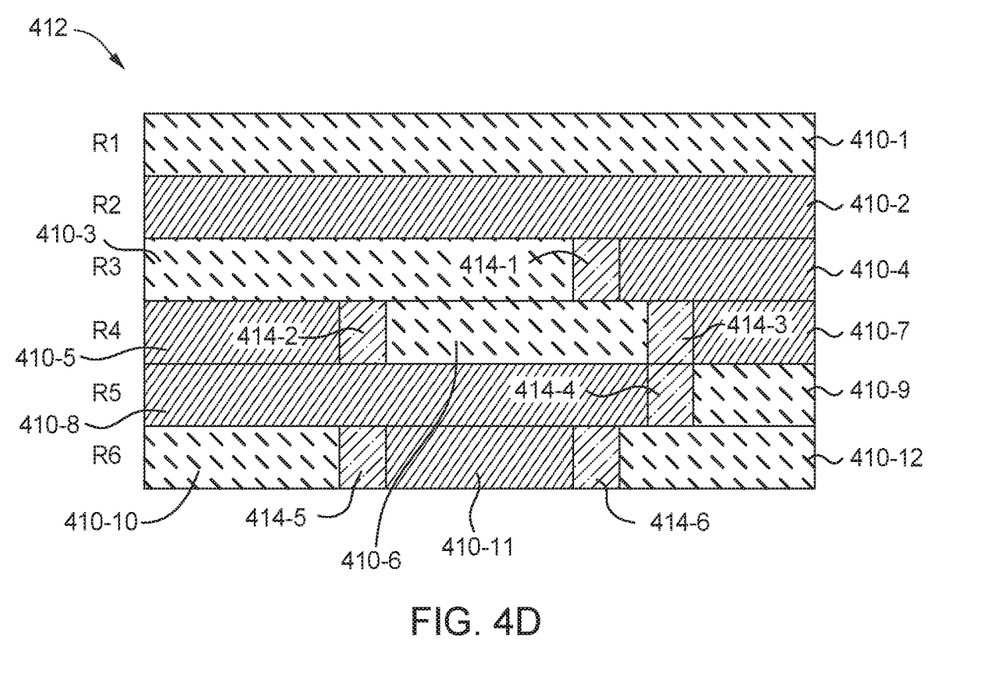

At step 412, the locations for separator cells 414-1, 414-2, ..., 414-6 are determined. As shown, the separator cell 414-1 is located between groups 410-3, 410-4 in row R3, the separator cell 414-2 is located between groups 410-5, 410-6 in row R4, the separator cell 414-3 is located between groups 410-6, 410-7 in row R4, the separator cell 414-4 is located between groups 410-8, 410-9 in row R5, the separator cell 414-5 is located between groups 410-10, 410-11 in row R6, and the separator cell 414-6 is located between groups 410-11, 410-12 in row R6.

Figure 6:
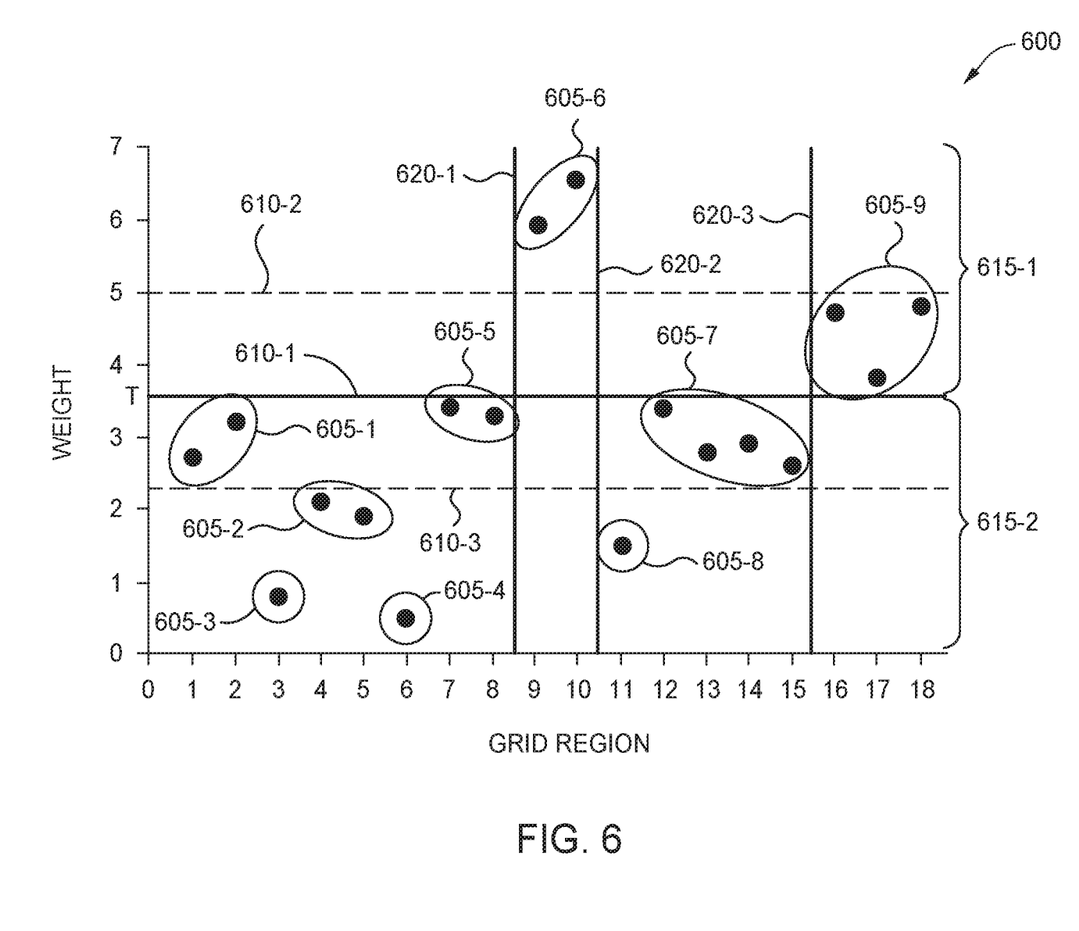
FIG. 6 illustrates assigning each group to a respective routing width group type, according to one or more embodiments.

FIG. 6 illustrates assigning each group to a respective routing width group type, according to one or more embodiments. The features illustrated in diagram 600 may be used in conjunction with other embodiments, e.g., as part of the method 200 of FIG. 2.

As discussed above, the grid regions may be classified into different clusters based on the respective weights. In some embodiments, the grid regions are classified into n different clusters, and forming the plurality of groups comprises optimizing a cost function based on the respective weight of each of the plurality of grid regions. In some embodiments, optimizing the cost function is performed according to:

$$G(n) = \frac{\sum_{i=1}^{n} D_i}{n} \left(0 < n < \frac{M}{2}\right),$$

where G (n) represents the cost function, $D_i$ represents a variance of the one or more weights included in each cluster, n represents a number of clusters, and M represents a total number of grid regions. In some embodiments, all possible combinations of the grid regions are considered to determine a minimum value of G(n). An exemplary algorithm for optimizing the cost function is provided in Table 1.

TABLE 1

Example algorithm for optimizing cost function

```
 1:  get_combinations(integer n, grid_number)
 2:  begin
 3:     pick (n−1) elements from 1 to grid_number for all possible case
 4:     for each pick (n−1) elements case
 5:        //each combination[ ][n−2] represents a combination
 6:        push (n−1) elements to combinations[i][n−2];
 7:        i++;
 8:  end
 9:  wsp_group_classification( )
10:     for i=1;i<num/2;i++
11:     begin
12:        combinations = get_combinations(i, num):
13:        for each combinations
14:        begin
15:           calculate target function value as CT
16:           compare CT with previous target function value PT
17:           store the smaller target function value as PT
18:           store corresponding combinations as result combinations RC
19:        end
20:        store the PT as CRT
21:        compare CRT with previous result PRT
22:        store the smaller target function value as the PRT
23:        store corresponding combinations as result combinations CRC
24:        store corresponding i as result packet number RPN
25:     end
```

In some embodiments, a threshold weight T is determined for assigning each group to a respective routing width group type 615-1, 615-2. In some embodiments, the threshold weight T is calculated according to:

$$T = \frac{\sum_{i=1}^{n} \overline{W_i}}{n} + \theta,$$

where $\overline{W_t}$ represents a mean value of weight for each cluster, and θ represents an adjustment factor. The adjustment factor θ may be adjusted to reduce a number of separator cells. In some embodiments, the adjustment factor θ is user-settable. In some embodiments, the adjustment factor θ has a default value within a range between ±10%.

As shown in the diagram 600, cluster 605-1 includes grid regions 1, 2, cluster 605-2 includes grid regions 4, 5, cluster 605-3 includes grid region 3, cluster 605-4 includes grid region 6, cluster 605-5 includes grid regions 7, 8, cluster 605-6 includes grid regions 9, 10, cluster 605-7 includes grid regions 12-15, cluster 605-8 includes grid region 11, and cluster 605-9 includes grid regions 16-18. The clusters 605-1, 605-2, . . . , 605-9 may represent an optimized cost function (e.g., the variance between grid region weights within each cluster is minimized).

The threshold weight T is set about 3.6 (illustrated as a boundary 610-1), such that clusters 605-1, 605-2, 605-3, 605-4, 605-5, 605-7, 605-8 depicted below the boundary 610-1 are assigned to the routing width group type 615-2. The clusters 605-6, 605-9 depicted above the boundary 610-1 are assigned to the routing width group type 615-1. Separator cells (indicated by lines 620-1, 620-2, 620-3) are located at each transition between the routing width group types 615-1, 615-2. Thus, adjusting the threshold weight T may result in different numbers of separator cells. For example, a threshold weight T of about 5 (illustrated as a boundary 610-2) may correspond to two separator cells (indicated by lines 620-1, 620-2), and a threshold weight T of about 2.3 (illustrated as a boundary 610-3) may correspond to four separator cells: a separator cell between the clusters 605-1, 605-3, a separator cell between the clusters 605-4, 605-5, a separator cell indicated by the line 620-2, and a separator cell between the clusters 605-7, 605-8.

Figure 8:
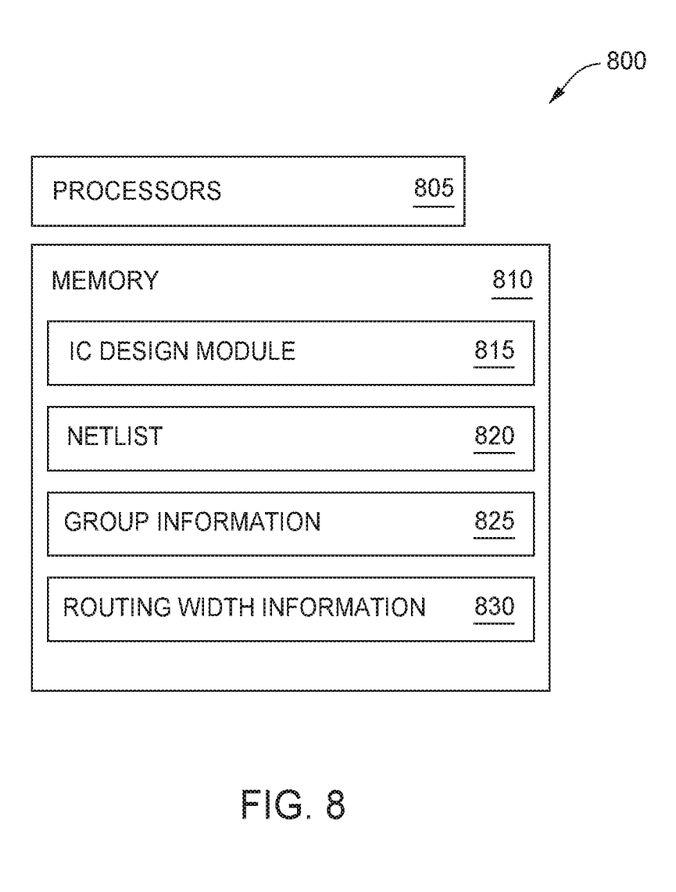
FIG. 8 illustrates an exemplary system, according to one or more embodiments.

FIG. 8 illustrates an exemplary system 800, according to one or more embodiments. The features of the system 800 may be used in conjunction with other embodiments, such as performing the method 200 of claim 2 using the IC design module 815 of the system 800.

The system 800 comprises one or more computer processors 805 (or "processors") and a memory 810. The system 800 may have any suitable implementation, such as a single computing device or multiple, communicatively coupled computing devices. The one or more processors 805 represent any number of processing elements that each can include any number of processing cores. The memory 810 can include volatile memory elements (such as random access memory), non-volatile memory elements (such as solid-state, magnetic, optical, or Flash-based storage), and combinations thereof. Moreover, the memory 810 can be distributed across different mediums (e.g., network storage or external hard drives).

The memory 810 may include one or more "modules" for performing various functions described herein. In one embodiment, each module includes program code that is executable by one or more of the processors 805. However, other embodiments may include modules that are partially or fully implemented in hardware (i.e., circuitry) or firmware of the system 800. As shown, the memory 810 comprises an IC design module 815 that performs some or all of the functionality described herein. In some embodiments, the IC design module 815 receives a netlist, which in some cases is a placed and optimized checkpoint netlist.

In some embodiments, the IC design module 815 divides a layout of a metal layer of the IC into a grid comprising a plurality of grid regions, calculates a respective weight for each of the plurality of grid regions, and forms a plurality of groups based on a similarity of the respective weights. Each group of the plurality of groups comprises a respective one or more contiguous grid regions of the plurality of grid regions. The IC design module 815 assigns each group of the plurality of groups to a respective routing width group type of a plurality of routing width group types, and determining a location for one or more separator cells between adjacent groups of the plurality of groups that are of different routing width group types. The assigned groups may be stored as group information 825 in the memory 810, and the routing width group types may be stored as routing width information 830 in the memory 810.

In some embodiments, the IC design module 815 performs the functionality within a WSP synthesis step of an IC design process. In some embodiments, the WSP synthesis step follows register transfer level (RTL) compilation, placement, and optimization (virtual and/or clock) steps. In some embodiments, the WSP synthesis step precedes other steps, such as wire synthesis, optimization (coarse and/or fine), early mode padding (EMPAD), routing, post-routing optimization steps.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for use in a design process for an integrated circuit (IC), the method comprising:
    dividing a layout of a metal layer of the IC into a grid comprising a plurality of grid regions;
    calculating a respective weight for each grid region of the plurality of grid regions;
    forming a plurality of groups based on a similarity of the respective weights, wherein each group of the plurality of groups respectively comprises one or more contiguous grid regions of the plurality of grid regions;
    assigning each group of the plurality of groups to a respective routing width group type of a plurality of routing width group types; and
    determining a location for one or more separator cells between adjacent groups of the plurality of groups that are of different routing width group types.

2. The method of claim 1, wherein the design process is a Self-Aligned Double Patterning (SADP) process supporting a 10 nanometer technology or smaller.

3. The method of claim 1, wherein the forming the plurality of groups comprises:
    optimizing a cost function based on the respective weight of each grid region of the plurality of grid regions.

4. The method of claim 1, further comprising:
    determining a first threshold weight for assigning each group of the plurality of groups to the respective routing width group type.

5. The method of claim 4, wherein the assigning each group of the plurality of groups to the respective routing width group type comprises:
    determining a first number of separator cells when assigning each group of the plurality of groups according to the first threshold weight; and
    determining a second threshold weight, such that assigning each group of the plurality of groups according to the second threshold weight corresponds to a second number of separator cells that is less than the first number of separator cells.

6. The method of claim 4, wherein the first threshold weight is based on a mean weight value for each group of the plurality of groups.

7. The method of claim 1, wherein the calculating the respective weight for each grid region of the plurality of grid regions is based on one or both of a timing slack and a congestion of the respective grid region.

8. A system comprising:
one or more computer processors configured to perform an operation for use in a design process for an integrated circuit (IC), the operation comprising:
dividing a layout of a metal layer of the IC into a grid comprising a plurality of grid regions;
calculating a respective weight for each grid region of the plurality of grid regions;
forming a plurality of groups based on a similarity of the respective weights, wherein each group of the plurality of groups respectively comprises one or more contiguous grid regions of the plurality of grid regions;
assigning each group of the plurality of groups to a respective routing width group type of a plurality of routing width group types; and
determining a location for one or more separator cells between adjacent groups of the plurality of groups that are of different routing width group types.

9. The system of claim 8, wherein the design process is a Self-Aligned Double Patterning (SADP) process supporting a 10 nanometer technology or smaller.

10. The system of claim 8, wherein the forming the plurality of groups comprises:
optimizing a cost function based on the respective weight of each grid region of the plurality of grid regions.

11. The system of claim 8, wherein the operation further comprises:
determining a first threshold weight for assigning each group of the plurality of groups to the respective routing width group type.

12. The system of claim 11, wherein the assigning each group of the plurality of groups to the respective routing width group type comprises:
determining a first number of separator cells when assigning each group of the plurality of groups according to the first threshold weight; and
determining a second threshold weight, such that assigning each group of the plurality of groups according to the second threshold weight corresponds to a second number of separator cells that is less than the first number of separator cells.

13. The system of claim 11, wherein the first threshold weight is based on a mean weight value for each group of the plurality of groups.

14. The system of claim 8, wherein the calculating the respective weight for each grid region of the plurality of grid regions is based on one or both of a timing slack and a congestion of the respective grid region.

15. A computer program product comprising:
a computer-readable storage device having computer-readable program code embodied therewith, the computer-readable program code executable by one or more computer processors to perform an operation for use in a design process for an integrated circuit (IC), the operation comprising:
dividing a layout of a metal layer of the IC into a grid comprising a plurality of grid regions;
calculating a respective weight for each grid region of the plurality of grid regions;
forming a plurality of groups based on a similarity of the respective weights, wherein each group of the plurality of groups respectively comprises one or more contiguous grid regions of the plurality of grid regions;
assigning each group of the plurality of groups to a respective routing width group type of a plurality of routing width group types; and
determining a location for one or more separator cells between adjacent groups of the plurality of groups that are of different routing width group types.

16. The computer program product of claim 15, wherein the forming the plurality of groups comprises:
optimizing a cost function based on the respective weight of each grid region of the plurality of grid regions.

17. The computer program product of claim 15, the operation further comprising:
determining a first threshold weight for assigning each group of the plurality of groups to the respective routing width group type.

18. The computer program product of claim 17, wherein the assigning each group of the plurality of groups to the respective routing width group type comprises:
determining a first number of separator cells when assigning each group of the plurality of groups according to the first threshold weight; and
determining a second threshold weight, such that assigning each group of the plurality of groups according to the second threshold weight corresponds to a second number of separator cells that is less than the first number of separator cells.

19. The computer program product of claim 17, wherein the first threshold weight is based on a mean weight value for each group of the plurality of groups.

20. The computer program product of claim 15, wherein the calculating the respective weight for each grid region of the plurality of grid regions is based on one or both of a timing slack and a congestion of the respective grid region.

* * * * *